March 31, 1959  R. E. TUTTLE  2,879,844
TUBE CUTOFF MACHINE
Filed Nov. 13, 1956  9 Sheets-Sheet 1

Fig. 1.

INVENTOR.
Richard E. Tuttle
BY
Reginald W. Hoagland
ATTORNEY

March 31, 1959 R. E. TUTTLE 2,879,844
TUBE CUTOFF MACHINE
Filed Nov. 13, 1956 9 Sheets-Sheet 5

INVENTOR.
Richard E. Tuttle
BY
Reginald W. Hoagland
ATTORNEY

March 31, 1959  R. E. TUTTLE  2,879,844
TUBE CUTOFF MACHINE
Filed Nov. 13, 1956  9 Sheets-Sheet 8

INVENTOR.
Richard E. Tuttle
BY
Reginald W. Hoagland
ATTORNEY

United States Patent Office 2,879,844
Patented Mar. 31, 1959

2,879,844

TUBE CUTOFF MACHINE

Richard E. Tuttle, Flint, Mich.

Application November 13, 1956, Serial No. 621,590

17 Claims. (Cl. 164—48)

This invention relates to tube cutoff machines, and more particularly, to machines that automatically feed and transversely cut tubes into sections of predetermined lengths.

In general, the present invention incorporates broadly the method of feeding a tube a predetermined distance through the machine, externally clamping the tube in position, passing a cutting tool tangentially of the wall of the tube for performing a preliminary cut depleting a portion or the entire wall thickness of the tube in accordance with the wall thickness of the tube to be severed, and then completely severing the tube with a second cutting tool directed at substantially right angles to the movement of said first cutting tool and initiated at said preliminary cut.

It is accordingly an object of the invention to provide a machine of this character which is fully automatic, self-contained and substantial in construction, and thoroughly efficient and practical in use.

Another object of the invention is to provide, in a machine of the character set forth, novel means for separate timed operations of a pair of tube-cutting tools.

Another object of the invention is to provide novel clamping jaws in the form of dies for rigidly engaging and supporting the tube during cutting operations and for directly assisting the cutters in producing practically finished end cuts on the severed parts of the tube that are free from scores, burrs, or deformations.

A further object of the invention is to provide, in a machine as set forth above, a novel pair of jaw- or die-clamping elements and operating means therefor for opening and closing said jaws or dies on the opposite sides of the tube in accordance with the timed other operations being performed on said tube.

A still further object of the invention is to provide, in a machine as outlined above, a novel cutting fluid supply system operated by a moving part of the machine for spraying a cutting fluid on one cutting tool at a time that the cutting fluid will run down on the other cutting tool and at the same time wash sheared chips from the parts and into a reservoir from which the fluid is again pumped after separation of said chips therefrom.

It is also an object of the invention to provide, in a machine of the character set forth, a hydraulic source of power from which fluid under pressure is piped and controlled to activators located at the essential elements of the machine for imparting motion thereto in the performing of operations to the tube.

These, together with various auxiliary features and objects of the invention which will later become apparent as the following description proceeds, are attained by the present invention, a preferred embodiment of which has been illustrated by way of example only in the accompanying drawings, wherein:

Figure 1:
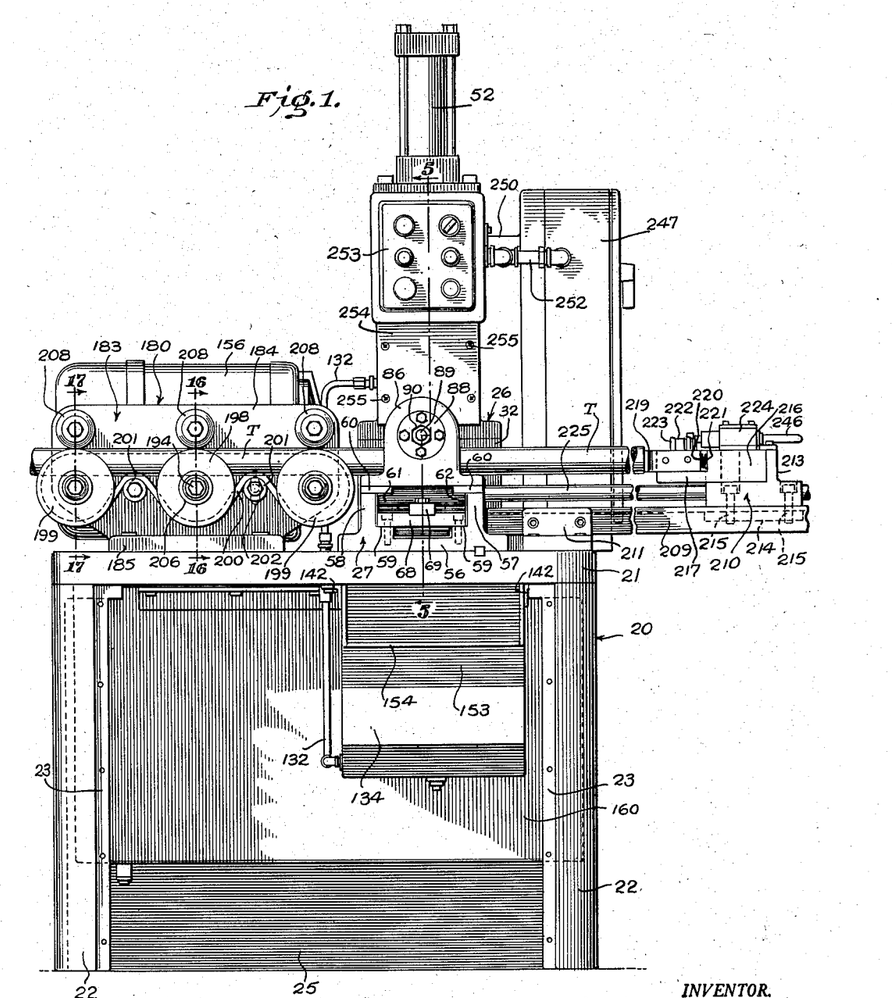
Figure 1 is a front elevation of the machine with a portion of the tube stop supporting structure broken away and with the front panel of the table removed.
Figure 2:
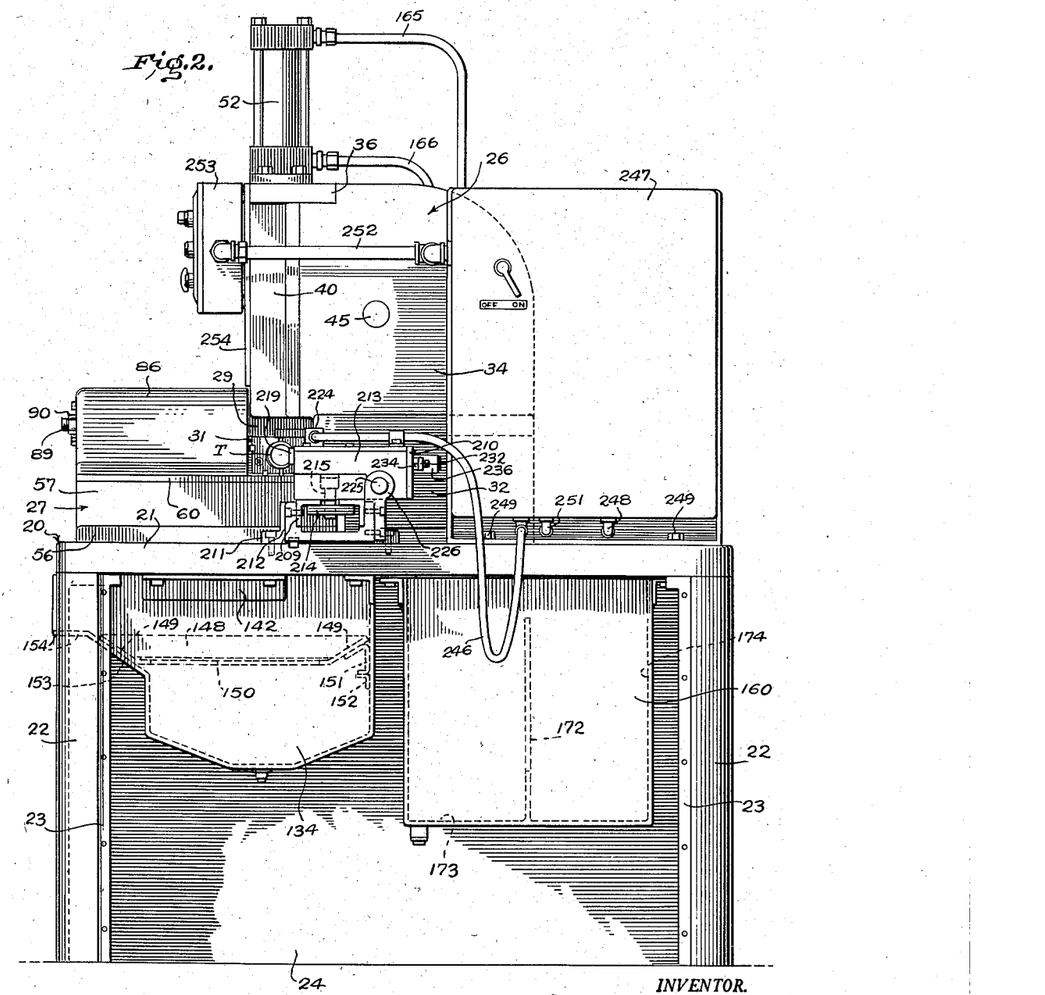
Figure 2 is a side elevation of the machine with a side panel of the table removed.

Referring more specifically to the accompanying drawings wherein like numerals indicate similar parts throughout the various views, the numeral 20 designates generally a rectangular table composed of a thick and relatively heavy top 21 supported in an elevated position and on a horizontal plane by legs 22 at the four corners thereof. The legs are recessed longitudinally thereof, as at 23, and as best shown in Figures 1 and 2, for reception and securement thereto of opposite vertical edge portions of side and end panels 24 and 25, respectively, that enclose the space beneath the top 21. Secured to and supported upon the upper surface of the table top 21 is a pair of frames indicated generally by the numerals 26 and 27, the frame 26 slidably supporting a vertically movable tube cutter head 28 and a horizontally movable tube cutter head 29, while the frame 27 slidably supports a pair of horizontally movable tube-clamping elements 30 and 31.

The cutter frame 26 consists essentially of a base member 32 keyed and bolted, as at 33, to the table top 21, a pair of spaced side members 34 and 35, one above each side of the base member and keyed and bolted thereto, and a top member 36 partially recessed in and bridging the upper portions of the side members. The upper central portion of the base member 32 is longitudinally recessed on a horizontal plane, as at 37, and undersurfaces of the side members 34 and 35 overlie side portions of said recess and, together with said recess, provide channel guideways 38 into which oppositely disposed guide rails 39 on the horizontal cutter head 29 are slidably mounted. The guideways 38 are lined with bearing strips on which the guide rails 39 of the cutter head slide. Forward and adjacent edge portions of both of the spaced side members 34 and 35 are vertically recessed, and vertically extending angle members 40 and 41, also forming a part of the frame 26, overlie these vertical recesses and are bolted to the side members to provide vertical guideways 42, lined as at 43, for slidably receiving oppositely directed guide rails 44 on the vertical movable cutter head 28.

Figures 5, 6:
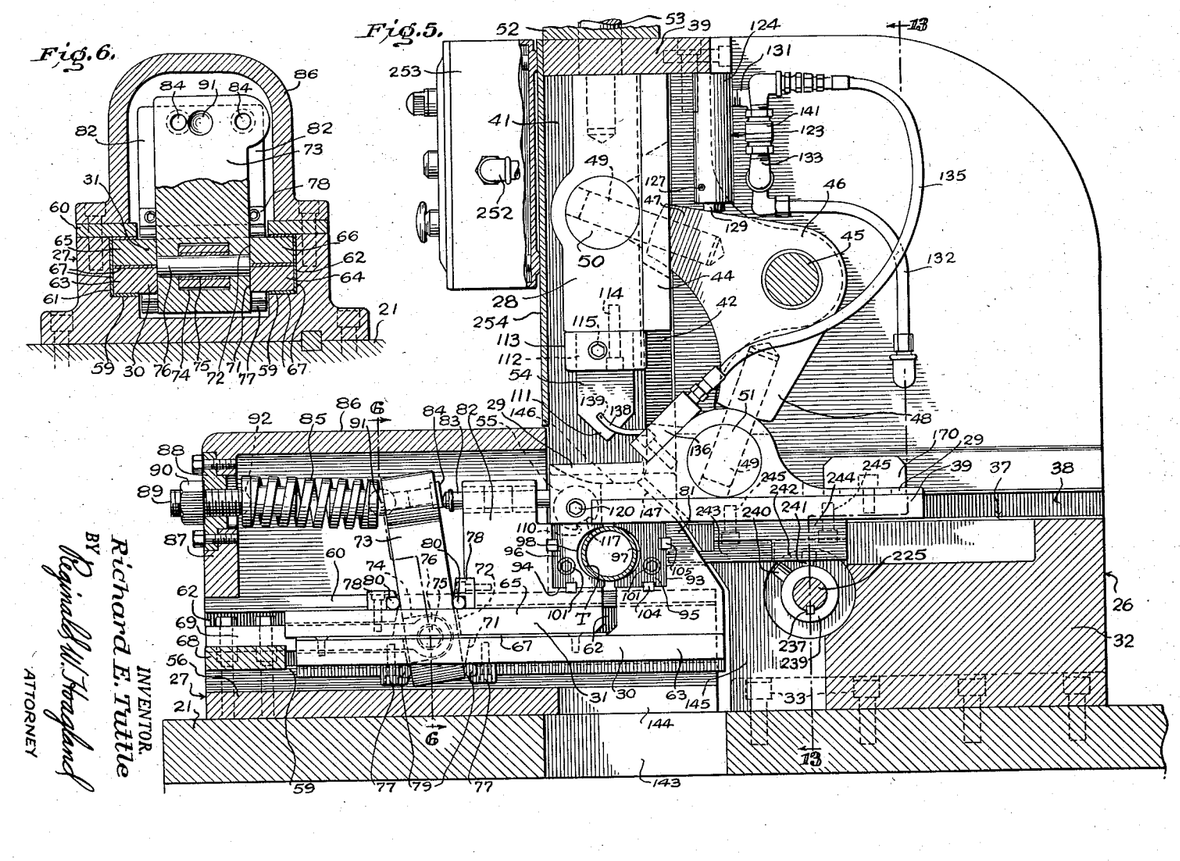
Figure 5 is an enlarged fragmentary vertical section taken on line 5—5 of Figure 1 and showing the parts in position during feeding of the tube.
Figure 6 is also a fragmentary section taken substantially on line 6—6 of Figure 5.
Figures 7, 8:
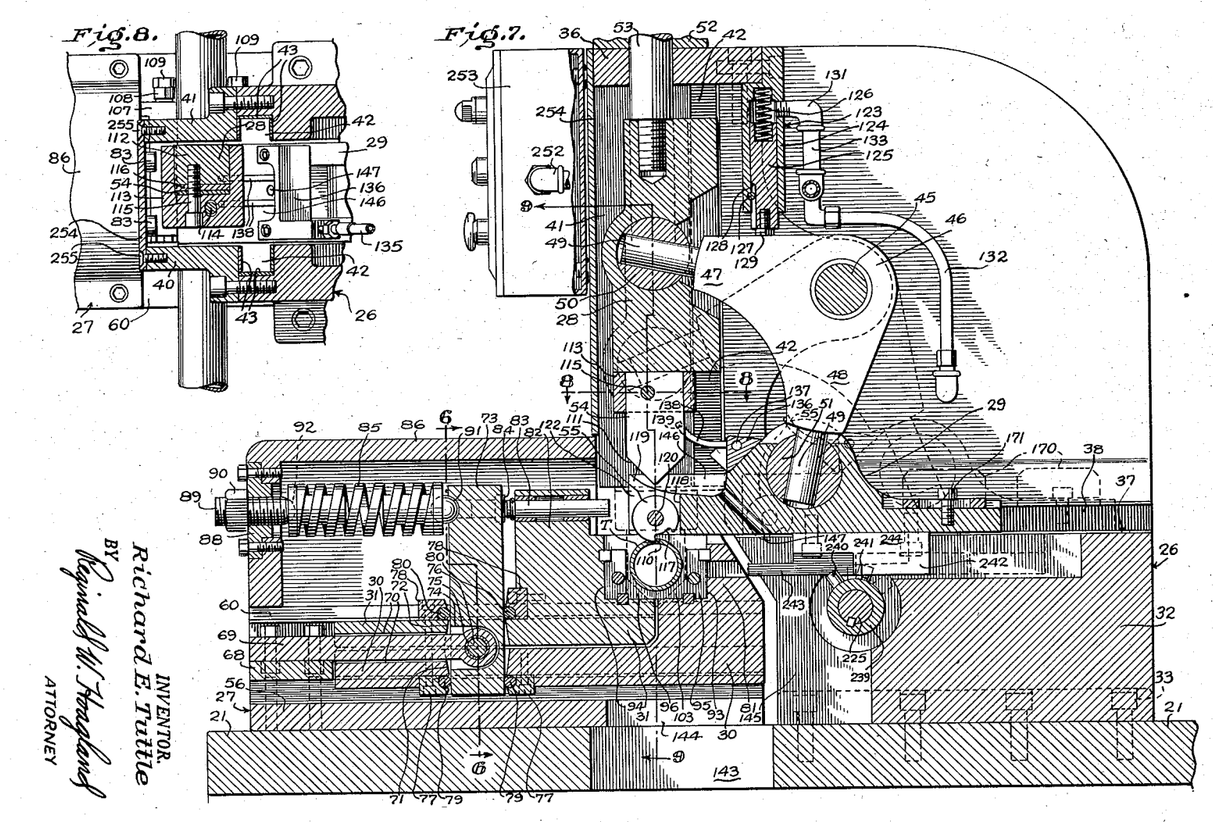
Figure 7 is a sectional view similar to Figure 5 but differing in that it shows the parts in full lines in the position midway of the preliminary cutting operation, and in dotted lines, directly after a tube has been severed.
Figure 8 is a fragmentary horizontal section taken substantially on line 8—8 of Figure 7.

Pivoted between the side members 34 and 35 and upon a transverse shaft 45, which has its opposite ends secured in openings in said side members, is a bell crank 46. Rigidly secured to or otherwise constructed on the ends of the pair of arms 47 and 48 of the bell crank 46 are pins 49 that are slidably received in transverse openings extending through cylindrical bearing elements 50 and 51 that are rotatably mounted on the cutter heads 28 and 29, respectively. Fixed to and projecting above the top member 36 of the frame 26 is a hydraulic cylinder 52 which has its plunger 53, as shown in Figures 5 and 7, threadably attached to the upper end of the vertically movable cutter head 28 for imparting reciprocatory motion to said cutter head. It is through this bell crank connection of the cutter heads that a like reciprocatory motion is imparted to the horizontally movable cutter head 29. Carried by the cutter heads 28 and 29 are cutting tools 54 and 55 for performing separate cutting operations during each severing operation of a tube section from a tube fed through the machine. The construction and arrangement of the cutting tools 54 and 55 and their relationship to one another as well as to the tube and other parts of the machine will be more clearly set forth as the description proceeds.

Figures 9, 11:
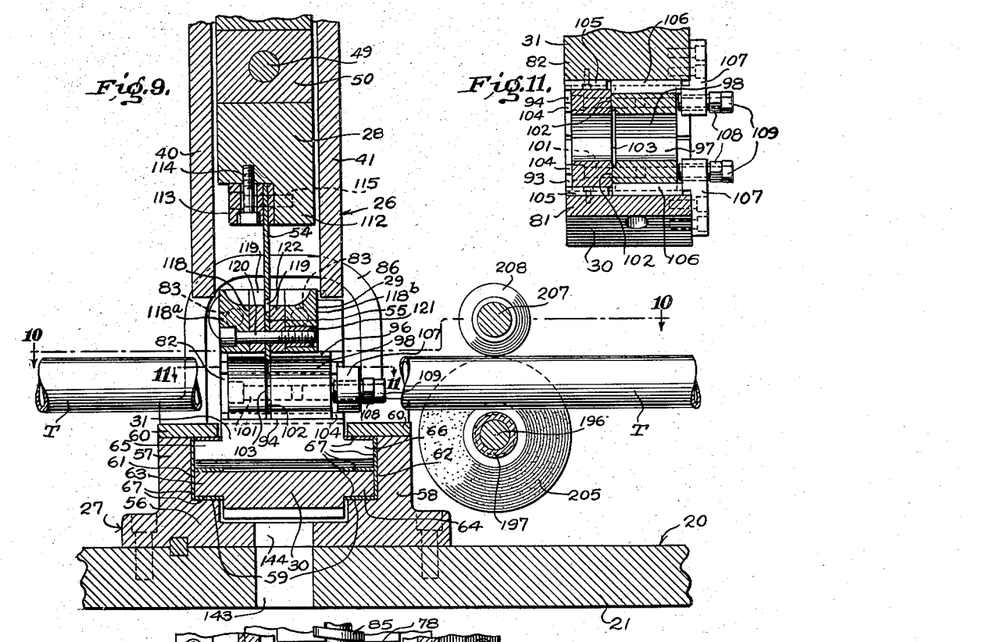
Figure 9 is a fragmentary vertical section taken substantially on line 9—9 of Figure 7 and having a portion of the tube broken away in order to more clearly show parts otherwise not visible.
Figure 11 is also a fragmentary horizontal section taken on line 11—11 of Figure 9.
Figure 10:
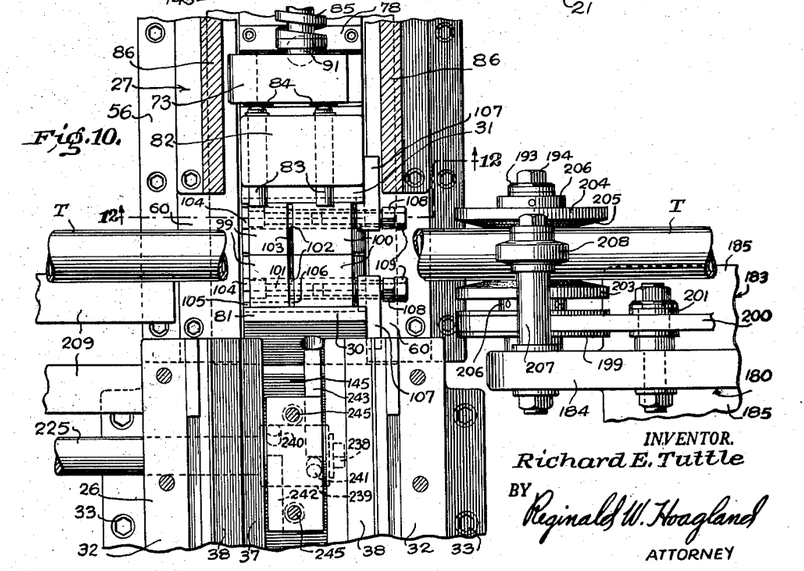
Figure 10 is a fragmentary horizontal section taken substantially on line 10—10 of Figure 9.

The other frame 27, which slidably supports the horizontally movable tube-clamping elements 30 and 31 is shown as constructed with a base member 56 having a pair of upstanding spaced side walls 57 and 58 extending longitudinally thereof. The base 56 is keyed and bolted rigidly to the upper side of the table top 21 in a manner similar to that of the base member 32 and is positioned parallel and forward of the frame 26 but has its center line slightly to one side of the center line of said base member 32 as best shown in Figures 9 and 10. Along the lower inner side of each of the side walls 57 and 58, there is a longitudinally extending ledge 59, and bolted against the top surface of each of the same side walls is a heavy plate 60 that overlies the ledge on the same side wall for providing a pair of channel guideways 61 and 62 into which are received oppositely disposed guide rails 63 and 64 on the clamping element 30 and guide rails 65 and 66 on the clamping element 31, respectively. The guide rails 65 and 62 are positioned above the guide rails 63 and 64, respectively, and bearing strips 67 between adjacent guide rails and other bearing strips lining said guideways provide slides for reciprocatory motion of the rails of both clamping elements 30 and 31 independent of one another.

A cross piece 68 secured to the outer end portions of both ledges 59 has secured to its intermediate portion the outer end of a bar 69 that extends inwardly through longitudinal, horizontal slots 70 in adjacent upper and lower sides of the clamping elements 30 and 31 and to a location where both of said clamping elements have provided therein vertically and substantially rectangular openings 71 and 72, respectively, through which extends the lower end of a rocker arm 73. On the terminus of the bar 69, which is within a socket 74 in the rocker arm, there is a bearing 75 for a transverse pin 76 carried by the lower end portion of the rocker arm; thus, it can be seen that the rocker arm 71 is pivotally supported adjacent its lower end by the stationary bar 69. Recessed in and bolted to the lower side of the clamping element 30 and to the upper side of the clamping element 31 and at opposite sides of the transverse openings 71 and 72 extending through said clamping elements are bearing blocks 77 and 78, respectively, which support bearing pins 79 and 80, respectively, in engagement with opposite sides of the rocker arm 73, both above and below the pivotal support for the rocker arm. Thus, upon pivotal movement of said rocker arm in one direction, said clamping elements 30 and 31 will be slid horizontally in the guideways and in opposite directions.

On the inner end portions of the clamping elements 30 and 31, there are provided upturned clamping heads 81 and 82, respectively, the head 81 being inwardly of the head 82 and each at an opposite side of the area through which the tube, designated by the letter T is longitudinally fed. An upward extension on the clamping head 82 slidably supports for limited horizontal movement a pair of hardened pins 83 protruding beyond opposite sides of said extension and positioned lengthwise between the horizontally movable cutter head 29 and the upper end portion of the rocker arm 73, there being hardened inserts 84 fixed in said rocker arm that receive the impact of engagement of the pins 83 with said arm. On the opposite side of the upper end portion of the rocker arm 73, there is a heavy compression spiral spring 85 resisting movement of the rocker arm by the cutter head 29 and for returning the rocker arm and clamping elements to their initial positions upon disengagement of said cutter head with the pins 83.

A hood 86 of considerable strength and with a closed end 87 is bolted at its opposite sides to the top surfaces of the plates 60 and encloses the clamping head 82, rocker arm 73, spring 85, and all minor elements associated therewith, as clearly shown in Figures 5 and 6. The end wall 87 of the hood has a removable insert 88 therein through which an adjustment screw 89 with a lock nut 90 thereon is threaded for varying the tension of the spring 85, there being a ball-and-socket connection 91 between one end of the spring and the rocker arm and another ball-and-socket connection 92 between the spring and the adjustment screw 89 to care for arcuate movement of said rocker arm.

The adjacent sides of the clamping heads 81 and 82 are recessed throughout their widths to provide right-angled seats 93 and 94 for removably and rigidly supporting jaws 95 and 96, respectively, that close in on the tube T from opposite sides to hold the same against movement and to exteriorly support the wall of the tube against deformation throughout its entire circumference during severing operations. In the present instance, jaws are shown for use with a round tube of a relatively large diameter, thus requiring relatively large semicircular surfaces 97 and 98 on said jaws for engagement around the tube. However, it is to be understood that other jaws may be employed to accommodate tubes of different sizes and cross sectional shapes. Each jaw is composed of a pair of dies 99 and 100 secured together by a bolt 101, as best shown in Figures 9, 10, 11, and 12, there being a spacing shoulder 102 on the die 100 that abuts the die 99 to provide upper and inner spaces 103 between the dies 99 and 100 through which the cutting tools 54 and 55 pass. Both dies 99 and 100 are held against forward movement and out of their respective seats by a key 104 and against upward vertical movement by a pair of end-to-end keys 105 and 106. The key 105 holds the die 99 and is secured to its respective head, while the key 106, which is of greater width, holds the die 100 and is itself held in place by abutting at its opposite ends the die 99 and a bracket 107 secured to a side of its respective clamping head. A lock screw 108 is threaded through the bracket 107 and in turn has a feed screw 109 threaded therethrough and also threaded in the die 100 for drawing and locking the die 99 in engagement with the end of the key 106. Thus, it can be seen that when substituting or replacing the same dies in the clamping heads, the spaces 103 between the dies 99 and 100 will be properly aligned with the cutting tools 54 and 55 for passage of said tools through said spaces, it being understood that the keys 106 that determine the lateral location of the dies are precision-ground as to proper length.

Reference is now made to Figures 5, 7, and 9 of the drawings wherein it will be observed that the tube T to be severed is fed longitudinally thereof beneath and in close proximity to the forward portion of the horizontal cutter head 29 while said head is in its initial position prior to a cutting operation and that the path of horizontal movement of the cutting edge 110 of the tool or blade 55 carried by said cutter head is tangentially of the wall of the tube and through the upper portions of the spaces 103 between clamping dies for cutting partially or entirely through the wall of the tube upon a pass of the tool or blade over the tube. It will further be observed that the horizontal center line of the tube T is intersected by the downward path of movement of the point of the V-shaped cutting edge 111 of the tool or blade 54, which also passes through the spaces 103 between die sections, and which completes the cut initiated by the tool or blade 55.

The cutting tool 54, which is in the form of a blade, is of a width slightly greater than the diameter of the tube T and of a thickness closely fitted to the space 103 between adjacent end surfaces of the dies 99 and 100 so as to function with edges at die end surfaces to produce shearing actions at opposite sides of the wall of the tube upon movement of the blade downwardly through the spaces 103. The cutting tool or blade 54, which is dependent from the lower end of the cutter head 20, is detachably fixed to a reduced lower end portion 112 of said head by a U-shaped bracket 113 that straddles said reduced end portion and clamps the upper end portion of the blade between same and said reduced end. A vertical screw 114 and a horizontal screw 115 hold the bracket in place, and a shim 116, which may vary in thickness and as shown in Figure 8, is inserted between the reduced end portion 112 and the bracket 113 for proper positioning and aligning of the blade with the spaces 103 between dies.

The other cutting tool 55, which is carried by the horizontally movable head 29 and which has the cutting edge 110 thereon, is in the form of a circular disc that has its major portion within and clamped to the head 29. A peripheral portion of the disc is notched, as at 117, to produce the cutting edge 110 which protrudes below said cutter head for engagement with the tube T. To securely clamp the disc-shaped cutting tool 55 in place, the forward end of the cutter head is bifurcated, as at 118, for snugly receiving in the space between branches 118a and 118b, the tool 55 and an adapter 119 on each side thereof, as shown in Figure 9, it being understood that the adapters will vary in thickness in accordance with the thickness of the tool 55 being used so as to effect a precision fit between the branches 118a and 118b. A bolt 120, with its head seated on a shoulder in the branch 118a, extends through holes in both branches 118a and 118b, both adapters 119, and cutting tool 55 and has a collar 121 threaded thereon that bears against an adapter for clamping both adapters and the tool against the inner surface of the branch 118, said collar being splined or otherwise held against turning movement in the hole in the branch 118b. The space 122 between the adapters 119, both forwardly and upwardly of the tool 55 permits the pointed end of the other tool 54 to pass between the adapters during its reciprocatory movement, as can best be seen in Figure 9 and from the position of parts shown in full lines in Figure 7.

To facilitate cutting of the tube T and the removal of cuttings and chips produced during cutting from vital parts of the machine where, upon accumulation, they could interfere with efficient operation of the machine, a cutting fluid is sprayed upon opposite sides of the cutting tool or blade 54 when parts of the machine are in positions so that surplus cutting fluid sprayed will supply the other cutting tool 55 with cutting fluid and will wash chips off of parts and to a location where the chips cannot obstruct operation. The timing of cutting fluid spraying operations is accomplished by a pump 123 mounted on the top member 36 of the frame 26 and depending to a location whereby its plunger, protruding from its lower end, is engaged and depressed by the arm 47 of the bell crank 46 during return movement of the cutter heads 28 and 29 to their initial positions.

The pump 123 consists of a cylinder 124 having a plunger 125 slidable therein, a spring 126 forcing said plunger outwardly, a cross pin 127 and shoulder 128 in said cylinder on said plunger, respectively, for limiting outward movement of the plunger, and a hardened end piece 129 on said plunger for contacting the arm of the bell crank. Communicating at the head of the cylinder 124 and at different sides thereof is a pair of pipe fittings 130 and 131 which in turn have ends of pipe lines 132 and 133, respectively, connected thereto. The pipe line 132 extends downwardly through the table top 21 after extending outwardly through the side member 35 and has its opposite or lower end communicating with the lower portion of a hopper-like cutting fluid reservoir 134. The other pipe line 133 has a flexible pipe section 135 thereon which, through usual pipe fittings, is connected to a special fitting 136 secured forwardly and upwardly on the horizontally movable cutter head 29, as shown in Figures 5, 7, and 8. The special fitting 136 is of block formation having a laterally extending bore 137 therein that communicates with the pipe line 133 and with a pair of forwardly projecting and upturned tubes 138 carried by said block and positioned to be moved to opposite sides of the cutting blade 54 during spraying operation of the pump 123. Jetlike openings 139 on the adjacent sides and near the free and closed ends of the tubes 138 direct the cutting fluid on both sides of the blade 54. In the pipe lines 132 and 133 and located near the pump 123 are oppositely arranged check valves 140 and 141, respectively, that are opened and closed in accordance with the strokes of the pump to produce intermittent flows of fluid from the reservoir 134 through the jet openings 139.

The hopperlike reservoir 134 is bolted to the underside of the table top 21 by means of angle irons 142 and has its top open for receiving cutting fluid mixed with metal chips and cuttings washed from the blades 54 and 55 as well as from other associated parts of the machine. Directly above the open top of the reservoir 134, there is a relatively large hole 143 in the table top 21 which aligns with an opening 144 in the base member 56 of the clamping frame 27, and which communicates with a large channel-like opening 145 in the forward end of the base member 32 of the frame 26. The forward portion of the upper side of the horizontally movable cutter head 29 and tops of the adapters 119 are scooped out to provide a cavity 146 for catching and directing cutting fluid downwardly through an opening 147 also in said cutter head and into the channel-like opening 145 where said fluid may return to the reservoir by passing through the opening 144 and hole 143.

Removably mounted in the hopperlike reservoir 134 and spaced substantially midway of its depth is a tray 148 having sloping sides 149 and a perforated bottom 150 for catching and separating cuttings and chips from the cutting fluid being returned to the reservoir. Feet 151, welded or otherwise fixed to sloping sides 149 of the tray, rest on angles 152 that are secured to inner sides of the wall of the reservoir, as clearly illustrated in Figures 2 and 13 of the drawings. One sloping side 149 of said tray rests directly on a slanting wall portion 153 of the reservoir and a horizontal extension 154 on said slanting wall portion, together with other reservoir side walls at right angles thereto, protrude slightly through a rectangular opening 155 in an end panel 25 of the table 20. With the use of a hoe-like scraping tool, cuttings and chips may be raked from the tray 148 outwardly through the opening 155.

Figure 4:
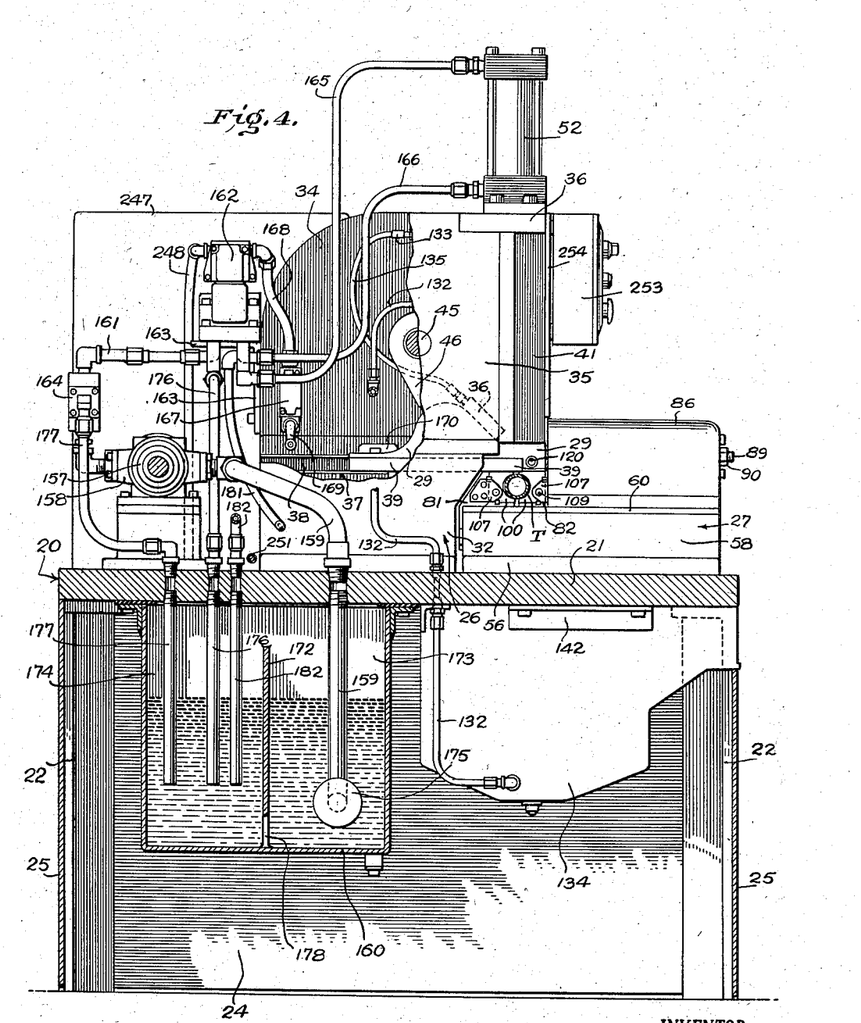
Figure 4 is a vertical section taken substantially on line 4—4 of Figure 3.

An electric motor 156 mounted on the table top 21 is connected by means of a resilient coupling 157 to a hydraulic rotary pump 158, also supported by said table top for supplying oil under pressure to operate the hydraulic cylinder 52. A pipe line 159 connected to the intake side of the pump 158 extends downwardly through the table top 21 and into the lower portion of an oil reservoir 160, also bolted to the underside of the table top as best shown in Figure 4. The other, or output side of the pump 158 has a pipe line 161 leading therefrom to a solenoid-actuated multiple way valve 162 mounted on brackets 163 which in turn are mounted on the rear of the side members 34 and 35, there being a pressure relief value 164 in the line 161 for maintaining the desired pressure of oil supplied to the valve 162. From a pair of controlled output ports of the valve 162, pipe lines 165 and 166 lead to and communicate with upper and lower ends, respectively, of the hydraulic cylinder 52. A microswitch 167, mounted on the inside of the side member 34 of the frame 26, as shown in Figure 4, is electrically connected by wires in a conduit 168 to a solenoid in the valve 162 for reversing the flow of oil through the pipe lines 165 and 166 to the hydraulic cylinder 52 when the arm 169 of said switch is engaged by a cam 170 adjustably supported, as shown at 171 in Figures 5 and 7, to the upper rear portion of the horizontal cutter head 29. Thus, immediately after strokes of the cutter heads 28 and 29 effecting cutting operations, the reversing of the flow of oil in the pipe lines 165 and 166 will return said heads to their initial positions.

The oil reservoir 160 has a vertical partition 172 therein dividing its interior into a pair of compartments 173 and 174, and it is into the compartment 173 that the pipe line 159 extends and has a filter 175 on its lower extremity. Into the other compartment 174 are extended the lower end of oil return lines 176 and 177 connected at return ports to the valves 162 and 164, respectively. The partition 172, while having an opening 178 in its lower portion to permit oil in the lower parts of the compartments 173 and 174 to circulate freely from one compartment to the other, acts as a baffle for preventing churned up oil, recently returned to the reservoir, from becoming sucked into the pipe line 159 supplying oil to the pump 158.

Also operated by oil pressure created by the pump 158 and controlled by the solenoid-actuated multiple way valve 164 is a rotary hydraulic motor 179 for driving a tube feed mechanism, indicated generally by the numeral 180. A pipe line 181, with one end connected to the pipe line 166 that supplies oil under pressure to return the cutter heads to their starting position, has its opposite end connected at the intake port of the motor 179. An oil return pipe line 182 leading from the motor extends downwardly through the table top and into the compartment 174 of the reservoir 160. By having the oil supply pipe line 181 connected to the pipe line 166, as just described, the motor 179 of the feed mechanism is started while the clamping jaws 95 and 96 are holding the tube T against movement which will produce slippage of the feed on the tube until said tube has been released by the jaws. Should this be found undesirable for any reason, the pipe line 181 may be connected to another and separate output port of the multiple way valve 162 and a microswitch similar to the switch 167 may be employed and engaged by the rocker arm 73 so as to delay starting of the feed mechanism until the tube T is free to be advanced forwardly, it being understood that this additional microswitch would be wired to a solenoid of the valve 162 that controls the flow of oil to the pipe line 181.

Figure 16:
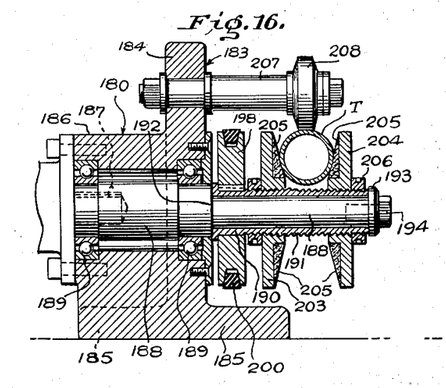
Figures 16 and 17 are vertical sections taken on line 16—16 and 17—17 of Figure 1, respectively.
Figure 17:
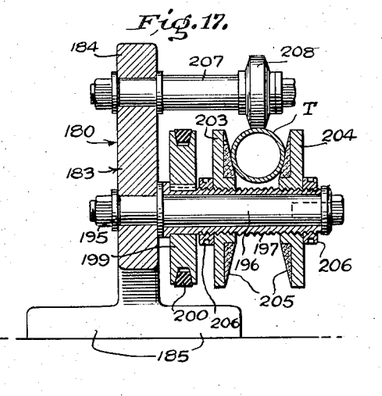

The feed mechanism 180 has a one-piece frame 183 consisting of an upstanding and horizontally elongated wall 184, oppositely directed base flanges 185 on said wall, and a bearing housing 186 on one side of said wall and substantially midway of its length. The base flanges 185 rest upon and are bolted to the upper side of the table top 21 at a location that positions the upstanding wall 184 parallel with but to one side of the line of travel of the tube T. The rotary hydraulic motor 179 is mounted on the rear side of the bearing housing 186 and has its drive shaft 187 received in and keyed to one end of a shaft 188 rotatably mounted on bearings 189 in said housing, as shown in Figure 16. The shaft 188 has its other end extended through and laterally of the upstanding wall 184, and on this extended portion of the shaft is a removable sleeve 190 which is externally threaded, as at 191, and which has its opposite ends rigidly clamped or locked between a shoulder 192 on said shaft and a collar 193 secured to the free end of said shaft by a bolt 194 threaded into said shaft.

Also extending laterally and to the same side of the upstanding wall 184, but fixed thereto, as at 195, is a pair of stub shafts 196 that rotatably support externally threaded sleeves 197. Shoulders, collars, and bolts similar to those on the rotary shaft 188 are employed for holding the sleeves 197 against end movement on the stub shafts 196, but no clamping or locking action is produced. The fixed stub shafts 196 are at opposite sides of, at the same elevation as, and parallel with the rotatable shaft 188.

Keyed or otherwise fixed on the sleeve 190 and pair of sleeves 197 and positioned adjacent the wall 184 are pulleys 198 and 199, respectively, over which is trained a V-belt 200 for imparting in the same direction rotation of the sleeves 197 by the sleeve 190. A pair of idler rollers 201, also mounted on the wall 184 and located one at each side of the center pulley 198, have the lower run of the belt 200 that extends under the pulley 198 trained thereover for effecting sufficient frictional engagement of the pulley 198 with the belt 200 to drive the pulleys 199. One of the rollers 201 is adjustably mounted in a slotted opening 202 in the wall 184 for the purpose of applying proper tension on the belt 200. Threadably adjustable on each of the sleeves 190 and 197 is a pair of feed discs 203 and 204, and it is between slightly cone-shaped adjacent surfaces 205 of all pairs of discs 203 and 204 that the tube T is positioned and engaged for longitudinal movement upon rotation of said feed discs. Also threaded on the sleeves 190 and 197 are collars 206 that are tightened to bind against sides of the discs 203 and 204 to lock the same in adjusted positions on the sleeves. The cone-shaped surfaces 205 are on lining pieces of frictional material cemented or otherwise affixed to the inner sides of the discs 203 and 204. Parallel with and directly above each of the shafts 188 and 196 are other stub shafts 207 which are also secured to the upstanding wall 184 and which support rollers 208 in engagement with the upper side of the tube T for holding said tube in contact with the cone-shaped surfaces 205 of the feed discs 203 and 204. While the feed discs 203 and 204 and the rollers 208 are shown as comprising the only means of supporting and guiding movement of the tube T when said tube is not engaged by the clamping jaws 95 and 96, it is to be understood that other supports or guides may be employed if so desired.

Figures 12, 13:
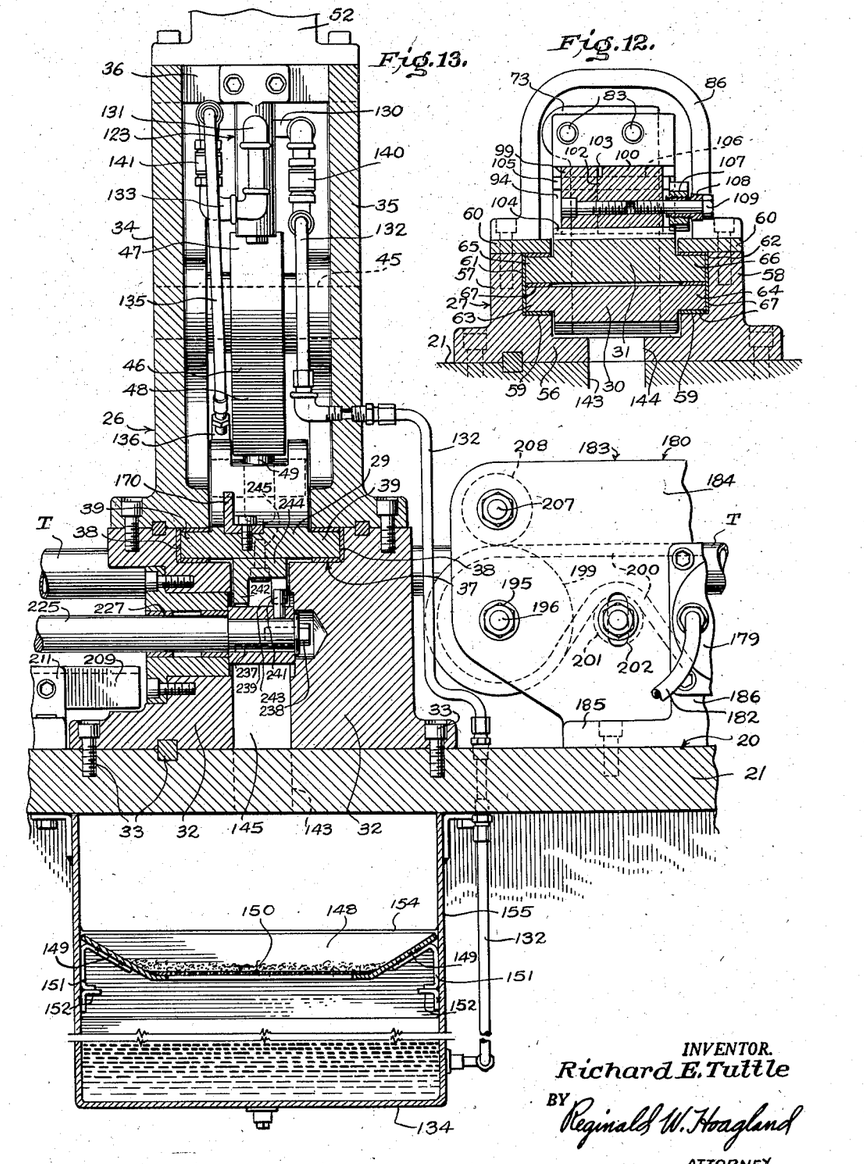
Figure 12 is a fragmentary vertical section taken substantially on line 12—12 of Figure 10.
Figure 13 is a fragmentary vertical section taken substantially on line 13—13 of Figure 5.

Attached to and extending horizontally and outwardly from the side of the table top 21 opposite that to which the tube feed mechanism 180 is mounted is a pair of angle irons 209 that have adjustably supported therealong a tube stop mechanism, generally designated by the numeral 210 and against which the tube T is fed by said feed mechanism. The inner end portions of the angle irons 209 slightly overlap the table top and their attachment to said table top is by means of a bracket 211 secured to both said table top and said angle irons, as best shown in Figures 1 and 13. This arrangement permits adjustment of the tube stop mechanism 210 to a position adjacent the clamping jaws 95 and 96 for cutting extremely short tube sections from the tube T. It is for the same reason that the center of the clamping frame 27 is to one side of the center of the cutting frame 26, which permits the use of dies 99 of less breadth than the dies 100 which, together comprise the clamping jaws 95 and 96, as clearly shown in Figures 9, 10, and 11, it being the distance between the cutting tools 54 and 55 and the tube stop that determines the length of sections cut from the tube. The outer ends of the angle irons are held in spaced parallel relation to one another by a U-shaped bracket 212 bolted to said angle irons, which in turn may be supported (and not shown) by a brace from the machine or a leg engaging the floor.

Figures 3, 14, 15:
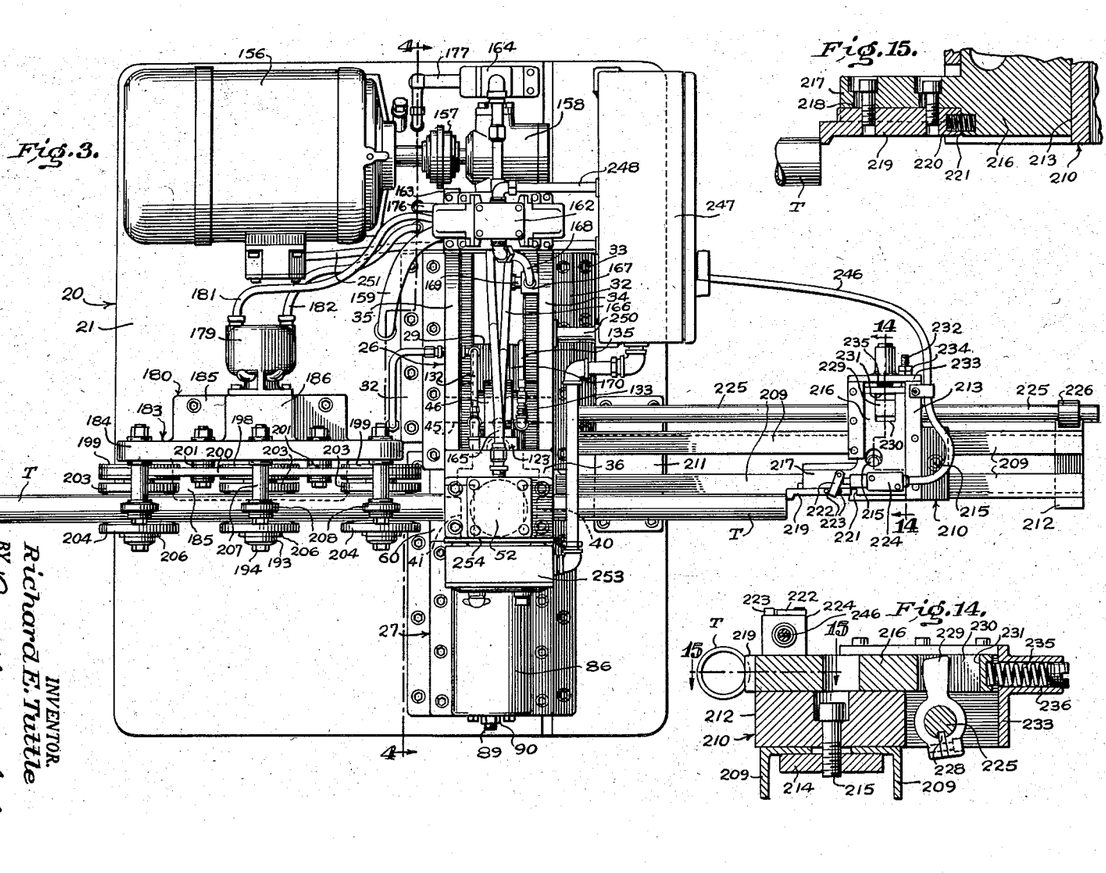
Figure 3 is a top plan of the machine.
Figure 14 is a vertical cross section taken on line 14—14 of Figure 3.
Figure 15 is a fragmentary horizontal section taken on line 15—15 of Figure 14.

The tube stop mechanism 210 has a main body member 213 which is slidable on top surfaces of the angle irons 209 in directions toward and away from the clamping and cutting frames 26 and 27, and which can be locked in adjusted position against said top surfaces by a clamping plate 214 bearing against undersurfaces of the angle irons, there being a pair of bolts 215 carried by the body 213, extending downwardly between the angle irons 209, and threaded into the clamping plate 214 for drawing the plate upwardly into clamping position. Slidably mounted in a recess in the body member 213 and movable laterally of the angle irons 209 is a stop head 216 which has a side projection 217 thereon that in turn slidably supports, as at 218, a tube-contacting finger 219 movable longitudinally thereof and at right angles to the sliding movement of the head. A spring 220 yieldably holds the finger 219 in projected position away from a stop shoulder 221 on the head 216, and this spring must first be compressed before the stop shoulder is engaged by the finger for limiting feeding movement of the tube T, as shown in Figure 15. An arm 222 pivoted on the top of the side projection 217 of the head 216 and engaged on its opposite sides by pins 223 on the finger 219 is pivotally moved to a position upon depressing of said spring for actuating a plunger of a microswitch 224 also carried by the head 216 and for a purpose to be set forth as the description proceeds. The arm and pin connection of the finger 219 to the microswitch 224 is to absorb impact which could destroy the mechanism of the microswitch.

A shaft 225 rotatably supported in a bearing member 226 bolted to the U-shaped bracket 212 and in a bearing 227 on the base member 32 of the cutter frame 26, as shown in Figure 13, extends along one side of the pair of angle irons 209 and is parallel therewith. Adjustable along and keyed to the shaft 225, as at 228 in Figure 14, is an arm 229 which projects into a slot 230 in the slidable head 216, and which is swung upon rotation of the shaft 225 to engage an end wall 231 of said slot and slide the head 216 to a position whereby the finger 219 is disengaged from the end of the tube T. The other position of the slidable head 216 is adjustable, for a purpose to be later set forth, there being a rod 232 fixed to said head, which after extending through an opening in the end wall 233 of the body member 213, has threaded thereon adjustment and lock nuts 234 for abutting the outer side of the end wall 233. A spring 235 in a socket 236 and adjustable as to its tension engages the head 216 and yieldably holds said head in the position engaging the adjustment nut 234 with the end wall 233 and finger 219 in the path of movement of the tube T.

On the inner end of the shaft 225 and inwardly of the bearing 227, there is rigidly secured by a key 237 and bolt 238, a collar 239 which has a pair of radially projecting pins 240 and 241 thereon for engagement with a pair of cam elements 242 and 243, respectively, on a bracket 244 secured to the underside of the horizontally movable cutter head 29 by bolts 245. From the position of parts shown in Figures 5 and 7, it will be observed that the cams 242 and 243 not only engage the radial pins 240 and 241 to rock the shaft 225 to its two different positions, but after rocking said shaft, are in the paths of movements of said pins for holding the shaft in the positions to which it has been rocked. It will be further observed that when the cutter heads are performing a cutting operation and are in substantially the positions shown in full lines in Figure 7, the rear end of the cam 243 is in engagement with the radial pin 241 and is turning the shaft 225 in a clockwise direction, which causes the depressed finger 219 on the slidable head 216 to become disengaged from the end of the tube section T being severed. Immediately after such disengagement, the spring 220 projects the finger 219 to a position at the side of the tube T where it remains until after the severed section of the tube has been released by the jaws 95 and 96 of the clamping elements 30 and 31. It should be pointed out that prior to disengagement of the jaws 95 and 96 with the tube T, the cutter head 29 in its return movement engaged the cam 242 thereon with the radial pin 240 and turned the shaft 225 and arm 229 counterclockwise to their other position, which would have allowed the head 216 to return to its initial position by pressure exerted by the spring 235 if it were not for the fact that the unsevered and clamped tube section was in the path of movement of the projected finger 219.

Electric wires in a flexible conduit 246 connect the microswitch 224 to terminal connections (not shown) in a main service box 247 which in turn are connected by wires through another conduit 248 to the solenoid-actuated multiple way valve 162 for registering ports of said valve that apply pressure through the pipe line 165 and to the top of the hydraulic cylinder 52, thus starting operation of the cutter heads 28 and 29. The main service box 247, which has the usual accessories therein, is bolted, as at 249, to the table top (Figure 2) and to the side member 34 of the cutter frame 26 by means of a brace 250 (Figures 1 and 3). Other conduits 251 and 252 connecting the main service box with the motor 156 and a push button box 253, respectively, have wires therein through which current is supplied to the motor and to the controls and signal lights of the push button box (Figure 3). The push button box 253 is mounted on the forward upper portion of a closure plate 254 bolted, as at 255 (Figures 1 and 8) to the forward vertical edges of both vertical angle members 40 and 41, and it is this plate, together with the hood 86, that practically encloses all working parts at the forward side of the machine.

*Operation*

To start cutting operations of the machine, it is necessary that the tube T be placed between the feed discs 203 and 204 of the feed mechanism 180, between the jaws 95 and 96 of the clamping elements 30 and 31 when in open position (Figure 5), and with the forward end of the tube T advanced to a position whereby it depresses the finger 219 of the tube stop mechanism 210. The shoulder 221 that arrests such depressed movement of the finger 219 limits further forward advancement of the tube, and its position determines the length of tube sections to be cut, there being slippage between the feed discs and the tube to hold the tube against said depressed finger. Through the arm 222, the movement of the finger 219 is transmitted to the microswitch 224, which upon closing a circuit to the solenoid-actuated multiple way valve 162, opens ports in said valve to produce a downward stroke of the plunger 53 of the hydraulic cylinder 52.

The vertically movable cutter head 28 which is fixed to the plunger 53 is likewise moved downwardly, and through the bell crank 48 connecting the horizontally movable cutter head 29 to the cutter head 28, said horizontal cutter head is moved rearwardly. At the start of this rearward movement of the cutter head 29, its forward end disengages the rear ends of the slidable pins 83, which permits the heavy spring 85 to move the rocker arm 73 to an upright position and thus close the clamping jaws 95 and 96 on opposite sides of the tube T. As the horizontally movable cutter head 29 continues to move rearwardly, the cutter tool 55 performs the initial cutting operation across the top of the tube T (Figure 7), and the cam 242, in engaging the radial pin 241, turns the shaft 225 to move the finger 219 on the tube stop mechanism to one side of the path of movement of the tube. As the cutter head 29 continues to move rearwardly and its forward end has cleared the path of vertical movement of the cutter blade 54 on the cutter head 28, said blade descends to a position that completes the cutoff (dotted lines, Figure 7) initiated by the horizontal cutting tool 55.

As the horizontally movable cutter head 29 approaches its extreme rearward position, the cam 170 on the upper side of its rear end portion engages the arm 169 of the microswitch 167 and closes another circuit to the solenoid-actuated multiple way valve 162 which opens ports to supply fluid under pressure to the pipe line 166 connected to the lower end of the hydraulic cylinder 52, it being understood that at such time, the other pipe line 165 acts as a return line for fluid in the cylinder 52 to flow back to the valve 162. The pipe line 181, for supplying fluid under pressure to the rotary hydraulic motor 179 of the tube feed mechanism 180, is shown as connected to the pipe line 166, which will cause the motor 179 to be operated while the plunger 53 in the hydraulic cylinder 52 is ascending, but as previously stated, feeding of the tube is not produced because of clamping engagement of the jaws 95 and 96 on the tube. During the return movement of the cutter heads 28 and 29 to their starting positions, the bell crank 48 engages and actuates the pump 123 so as to spray cutting fluid on opposite sides of the vertically movable cutter blade 54, while the cam 242 on the horizontally movable cutter head 29 engages the pin 240 and turns the shaft 225 so as to release pressure of the arm 229 on the spring-actuated slidable head 216 of the tube stop 210. As the horizontally movable cutter head 29 approaches the limit of its forward movement, its forward end engages the slidable pins 83 which in turn engage and rock the rocker arm 73 forwardly against tension of the spring 85 to a position that opens the clamping jaws 95 and 96 (Figure 5). Upon release of the tube T by the jaws, the tube feeding mechanism advances the tube through the open jaws, and at the same time ejects the severed section of the tube. When the recently severed end of the remainder of the tube is advanced by the feeding mechanism to a position whereby the stop finger 219 is again depressed, operation of the machine is repeated.

Figure 18:
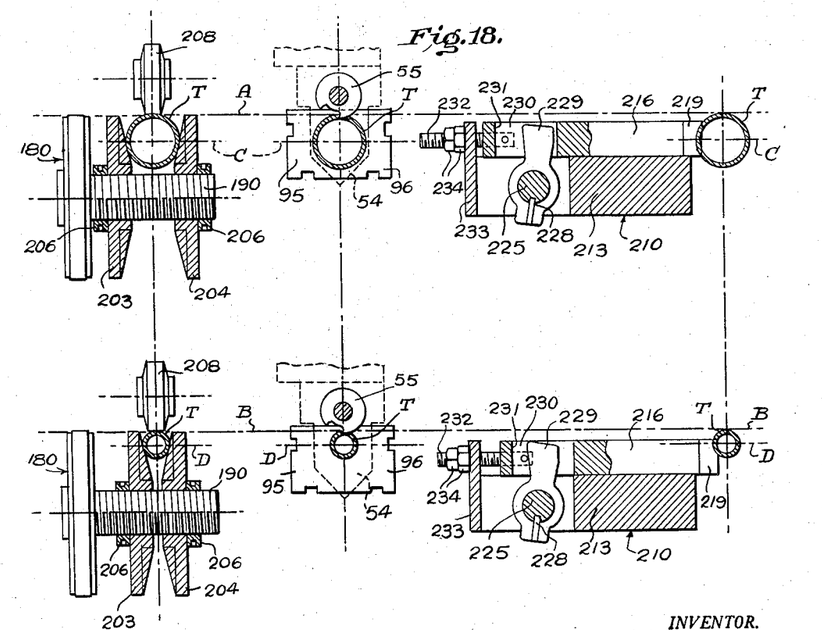
Figure 18 is a series of sectional views showing diagrammatically the adjustment and substitution of parts for severing tubes of two different diameters.

Attention is now directed to Figure 18 of the drawings wherein there is diagrammatically shown adjustments and substitutions of elements for severing tubes of two different diameters. By retaining the same elevation for the line of travel of the tops of tubes of all dimensions, as indicated by dash-and-dot line A on the tube shown of larger diameter, and B on the tube of smaller diameter, and varying the heights of the center lines C and D of the different size tubes, the changeover for handling different diameter tubes is simplified. While this system of changeover does require the use of different dies for the clamping elements 30 and 31, it merely requires simple adjustments as to the spacing of the feed discs 203 and 204 of the tube feed mechanism 180 and other simple adjustments of one lateral position of the finger 219 of the tube stop mechanism 210.

In view of the foregoing description taken in conjunction with the accompanying drawings, it is believed that a clear understanding of the construction, operation, and advantages of the machine will be quite apparent to those skilled in this art. A more detailed description is accordingly deemed unnecessary.

It is to be understood, however, that even though there is herein shown and described a preferred embodiment of the invention, various changes may be made without departing from the spirit and full intendment of the invention.

What is claimed is:

1. A tube cutoff machine comprising a frame, a pair of tube-clamping elements slidably mounted on said frame for movement on the same plane, oppositely disposed jaws on said clamping elements for engaging the tube at opposite sides thereof, a cutter head slidable on said frame and in the same general plane as that of said clamping elements, a cutting tool on said cutter head and with its cutting edge movable in a path so as to perform an initial cutting operation on the tube, other cutting means that completes the severing of a tube section from the tube at the cut performed by said cutting tool, a source of power for imparting a cutting stroke and a return stroke to said cutter head, and a mechanism in the path of movement of said cutter head and operatively connected to said clamping elements so as to slide said clamping elements in opposite directions and disengage said jaws from said tube upon engagement of said cutter head with said mechanism, said mechanism being engaged by said cutter head as it approaches the limit of movement during its return stroke.

2. A tube cutoff machine comprising a frame, a pair of tube-clamping elements slidably mounted on said frame for movement on the same plane, oppositely disposed jaws on said clamping elements for engaging the tube at opposite sides thereof, a member movable in opposite directions and relative to said frame and in engagement with both of said clamping elements so as to slide said clamping elements in opposite directions upon movement of said member in one direction, means yieldably holding said member in a position with said jaws in engagement with said tube, a cutter head slidable on said frame and in the same general plane as that of said clamping elements, a cutting tool on said cutter head and with its cutting edge movable in a path so as to perform an initial cutting operation on the tube, other cutting means that completes the severing of a tube section from the tube at the cut performed by said cutting tool, a source of power for imparting reciprocatory motion to said cutter head, and means engaged by said cutter head during the return stroke of its reciprocatory motion for moving said movable member against pressure of said yieldable means and to a position disengaging said jaws from said tube.

3. A tube cutoff machine comprising a frame, a pair of tube-clamping elements slidably mounted on said frame for movement on the same plane, oppositely disposed jaws on said clamping elements for engaging said tube at opposite sides thereof, a rocker arm pivotally supported on said frame and in engagement with both of said clamping elements so as to slide said clamping elements in opposite directions upon pivotal movement of said rocker arm in one direction, means yieldably holding said rocker arm in a position with said jaws in engagement with said tube, a cutter head slidable on said frame and in the same general plane as that of said clamping elements, a cutting tool on said cutter head and with its cutting edge movable in a path so as to perform an initial cutting operation on the tube, other cutting means that completes the severing of a tube section from the tube at the cut performed by said cutting tool, a source of power for imparting reciprocatory motion to said cutter head, and means engaged by said cutter head during the return stroke of its reciprocatory motion for moving said rocker arm against pressure of said yieldable means and to a position disengaging said jaws from said tube.

4. A tube cutoff machine comprising a frame, a pair of tube-clamping elements supported on said frame for sliding movement parallel to one another, oppositely disposed jaws on said clamping elements for engaging the tube at its opposite sides, a cutter head slidable on said frame and in the same general direction as that of said clamping elements, a cutting tool on said cutter head and with its cutting edge movable in a path so as to perform an initial cutting operation on the tube, means in the path of movement of said cutter head and interposed between said cutter head and said clamping elements for sliding said clamping elements in opposite directions and to positions disengaging said jaws from said tube, a second cutter head also slidable on said frame and movable in a general direction at an angle to said first-mentioned cutter head, a second cutting tool on said second-mentioned cutter head and having a path of movement that completes severing of said tube at the cut made by said first-mentioned cutting tool, a source of power for imparting reciprocatory motion to one of said cutter heads, and means operatively connecting the cutter heads so as to impart reciprocatory motion to the other of said heads.

5. A tube cutoff machine comprising a frame, a pair of tube-clamping elements supported on said frame for sliding movement parallel to one another, heads on said clamping elements and offset to a common side thereof one in advance of the other, oppositely disposed jaws on said heads for engaging the tube at its opposite sides, a rocker arm pivotally supported on said frame and in engagement with both of said clamping elements for sliding said clamping elements in opposite directions upon movement of said pivoted rocker arm in one direction, yieldable means for holding said rocker arm in a position with said jaws in engagement with said tube, a cutter head slidable on said frame and in the same general direction as that of said clamping elements, a cutting tool on said cutter head and with its cutting edge movable in a path for performing an initial cutting operation on the tube, a pusher element in the path of movement of said cutter head and interposed between said cutter head and said rocker arm so as to move said rocker arm against pressure tension of said yieldable means and to a position disengaging said jaws from said tube, a second cutter head also slidable on said frame and movable in a general direction at an angle to said first-mentioned cutter head, a second cutting tool on said second-mentioned cutter head and having a path of movement that completes severing of said tube at the cut of said first-mentioned cutting tool, a source of power for imparting reciprocatory motion to one of said cutter heads, and means operatively connecting the cutter heads so as to impart reciprocatory motion to the other of said heads.

6. A tube cutoff machine comprising a frame, a pair of tube-clamping elements slidably supported side by side on said frame, oppositely disposed jaws on said clamping elements for engaging the tube at its opposite sides, a rocker arm pivotally supported on said frame and in engagement with both of said clamping elements so as to slide said clamping elements in opposite directions upon pivotal movement of said rocker arm in one direction, means yieldably holding said rocker arm in a position with said jaws in engagement with said tube, a cutter head slidable on said frame and in the same general plane as that of said clamping elements, a cutting tool on said cutter head and with its cutting edge movable in a path tangentially of the wall of the tube so as to perform an initial cutting operation on the tube, means engaged by said cutter head during its sliding movement for moving said rocker arm against pressure of said yieldable means and to a position disengaging said jaws from said tube, a second cutter head also slidable on said frame and movable in a general direction at an angle to said first-mentioned cutter head, a second cutting tool on said second-mentioned cutter head and having a path of movement that completes severing of said tube at the cut made by said first-mentioned cutting tool, a source of power for imparting reciprocatory motion to one of said cutter heads, and a bell crank pivoted to said frame and having its arms connected to different cutter heads for imparting reciprocatory motion to the other of said heads.

7. A tube cutoff machine comprising a frame, movable tube-clamping elements on said frame, oppositely disposed jaws on said clamping elements for engaging the tube at its opposite sides, a cutter head slidable on said frame and having a cutting stroke from a position overlying said tube and jaws to a position at one side of said tube and jaws, a cutting tool on said cutter head and with its cutting edge movable in a path tangentially of the wall of the tube so as to perform an initial cutting operation on said tube during said cutting stroke, a second cutter head also slidable on said frame and having a cutting stroke at an angle to the movement of said first-mentioned cutter head, a second cutting tool on said second-mentioned cutter head and having a path of movement intersecting the path of movement of said first-mentioned cutting tool so as to completely sever the tube at the cut made by said first-mentioned tool, a source of power for imparting reciprocatory motion to one of said cutter heads, a bell crank pivoted on said frame and having its arms connected to different cutter heads so as to impart reciprocatory motion to the other of said heads, said bell crank being connected to said cutter heads so as to clear said first-mentioned cutter head from the position overlying the tube and jaws prior to effecting cutting of said tube with said second-mentioned cutting tool, and means for actuating said movable clamping elements by reciprocatory motion of one of said cutter heads.

8. A tube cutoff machine comprising a frame, a pair of movable tube-clamping elements on said frame and having adjacent right-angled faces thereon, said clamping elements having one face of each on the same plane and having the other face of each in spaced parallel relation to one another, a pair of substantially rectangular dies seated against both faces of each clamping element and each pair of dies having transverse recesses therein that oppose one another and together conform to the size and cross sectional shape of a tube so as to provide jaws for clamping the tube from opposite sides, separate transversely extending keys in both faces of both clamping elements and in the surfaces of all dies seated thereon, securing means for holding both dies of each pair together, other securing means for holding the pairs of dies against transverse movement, a pair of cutter heads slidably supported on said frame for movement at an angle to one another, a cutting tool on each of said cutter heads for performing separate cutting operations on the tube at said dies in the severing of a section from the tube, a source of power for imparting reciprocatory motion to both of said cutter heads, and means for actuating said movable clamping elements to disengage said dies from the tube.

9. A tube cutoff machine as defined in claim 8 wherein there is a shoulder on one die of each pair of dies which engages the other die of the same pair and thereby provides spaces between dies of each pair through which the cutting tools pass.

10. A self-contained hydraulically operated tube cutoff machine comprising a frame, a pair of clamping elements slidably supported on said frame for engaging the tube at its opposite sides, a pair of cutters slidably supported at an angle to one another for performing separate cutting operations on the tube in the severing of a section from the tube, an arm engaged and moved by movement of one of said cutters for disengaging said clamping elements from said tube, means operatively connecting said pairs of cutters so as to control the sliding movements of said cutters relative to one another, a hydraulic cylinder mounted on said frame and operatively connected to one of said cutters and through said means connecting said cutters imparts a cutting stroke and a return stroke to both of said cutters, a feed mechanism for advancing the tube through the machine, a rotary hydraulic motor for driving said feed mechanism, a power-driven fluid pump, a multiple way valve having its intake passageway connected to said pump and its outlet passageways connected to said rotary hydraulic motor and to opposite ends of said hydraulic cylinder, an adjustable tube stop carried by said frame and against which the tube is advanced by said feed mechanism, control means for said multiple way valve initially activated by engagement of the tube with the tube stop for imparting a cutting stroke to both of said cutters, and other control means for said multiple way valve and activated by a cutter for imparting a return stroke to both of said cutters and for effecting operation of said feed mechanism to advance the tube upon disengagement of said jaws from said tube.

11. A self-contained hydraulically actuated tube cutoff machine as defined in claim 10 wherein there is provided a table upon the top of which the frame rests and is secured, a hydraulic fluid reservoir supported beneath the top of the table, a hydraulic fluid supply pipe leading from said reservoir to the pump, a relief valve between said pump and the multiple way valve, and hydraulic fluid return pipes leading back to said reservoir from said relief valve, multiple way valve, and rotary hydraulic motor.

12. A self-contained hydraulically operated tube cutoff machine comprising a frame, a pair of tube-clamping elements slidably supported on said frame, jaws on said clamping elements for engaging the tube at its opposite sides, a pair of cutters slidably supported at an angle to one another for performing separate cutting operations on the tube in the severing of a section from the tube, means in the path of movement of one of said cutters for sliding said clamping elements in opposite directions and to positions disengaging said jaws from said tube, a bell crank pivoted on said frame and having its different arms connected to different cutters so as to control the sliding movements of said cutters relative to one another, a hydraulic cylinder mounted on said frame and operatively connected to one of said cutters and through said bell crank imparts a cutting stroke and a return stroke to both of said cutters, a feed mechanism for advancing the tube through the machine, a rotary hydraulic motor for driving said feed mechanism, a power-driven fluid pump, a multiple way valve having its intake passageway connected to said pump and its outlet passageways connected to said rotary hydraulic motor and to opposite ends of said hydraulic cylinder, an adjustable tube stop carried by said frame and against which the tube is advanced by said feed mechanism, control means for said multiple way valve initially activated by engagement of the tube with the tube stop for imparting a cutting stroke to both of said cutters, and other control means for said multiple way valve and activated by movement of a cutter for imparting a return stroke to both of said cutters and for effecting operation of said feed mechanism to advance the tube upon disengagement of said jaws from said tube.

13. A self contained hydraulically operated tube cutoff machine comprising a frame, a pair of tube-clamping elements slidably supported on said frame, jaws on said clamping elements for engaging the tube at its opposite sides, a rocker arm pivoted on said frame and in engagement with said clamping elements so as to slide said clamping elements in opposite directions upon movement of said rocker arm in one direction, spring means yieldably holding said rocker arm in a position with said jaws in engagement with said tube, a pair of cutters slidably supported at an angle to one another for performing separate cutting operations on the tube in the severing of a section from the tube, a bell crank pivoted on said frame and having its different arms connected to different cutters so as to control the sliding movements of said cutters relative to one another, a hydraulic cylinder mounted on said frame and operatively connected to one of said cutters and imparting a cutting stroke and a return stroke to both of said cutters, said rocker arm being forced against tension of said spring means to a position whereby said jaws are disengaged from the tube upon return of said cutters to their initial positions, a feed mechanism for advancing the tube through the machine, a rotary hydraulic motor for driving said feed mechanism, a power-driven fluid pump, a multiple way valve having its intake passageway connected to said pump and its outlet passageways connected to said rotary hydraulic motor and to opposite ends of said hydraulic cylinder, an adjustable tube stop carried by said frame and against which the tube is advanced by said feed mechanism, control means for said multiple way valve initially activated by engagement of the tube with the tube stop for imparting a cutting stroke to both of said cutters, and other control means for said multiple way valve and activated by movement of a cutter for imparting a return stroke to both of said cutters and for effecting operation of said feed mechanism to advance the tube upon disengagement of said jaws from said tube.

14. A tube cutoff machine comprising a frame, a pair of tube-clamping elements slidably supported side by side on said frame, oppositely disposed jaws on said clamping elements for engaging said tube at opposite sides thereof, a rocker arm pivotally supported on said frame and in engagement with both of said clamping elements for sliding said clamping elements in opposite directions upon movement of said pivoted rocker arm in one direction, spring means yieldably holding said rocker arm in a position with said jaws in engagement with said tube, a cutter head slidable on said frame and in the same general direction as that of said clamping elements, a cutting tool on said cutter head and with its cutting edge movable in a path tangentially of the wall of the tube for performing an initial cutting operation, a pusher rod in the path of movement of said cutter head and interposed between said cutter head and said rocker arm for moving said rocker arm against tension of said spring means and to a position disengaging said jaws from said tube, a second cutter head also slidable on said frame and movable in a general direction at an angle to said first-mentioned cutter head, a second cutting tool on said second-mentioned cutter head and having a path of movement that completes severing of said tube at the cut made by said first-mentioned cutting tool, a reciprocatory source of power that imparts a cutting stroke and a return stroke of one of said cutter heads, a bell crank pivoted to said frame and having its arms connected to different cutter heads for imparting reciprocatory motion to the other of said heads, a power-driven feed mechanism for advancing the tube through the machine, means actuated by movement of the cutter heads for starting and stopping operation of said feed mechanism, an adjustable stop against which the tube is moved by said feed mechanism in determining the length of cutoff sections of said tube, and means actuated by engagement of the tube with said stop for starting another cycle of operation of the source of power to reciprocate the cutter heads.

15. A tube cutoff machine comprising a frame, movable tube-clamping means on said frame, a cutter head slidable on said frame and having a cutting stroke from a position overlying said tube and jaws to a position at one side of said tube and jaws, a cutting tool on said cutter head and with its cutting edge movable in a path so as to perform an initial cutting operation on said tube during said cutting stroke, a second cutter head also slidable on said frame and having a cutting stroke at an angle to the movement of said first-mentioned cutter head, a second cutting tool on said second-mentioned cutter head and having a path of movement intersecting the path of movement of said first mentioned cutting tool so as to completely sever the tube at the cut made by said first-mentioned tool, a source of power for imparting reciprocatory motion to one of said cutter heads, a bell crank pivoted on said frame and having its arms connected to different cutter heads so as to impart reciprocatory motion to the other of said heads, a cutting fluid pump mounted on said frame and having its plunger in the path of movement of said bell crank so that said pump ejects cutting fluid during return of said heads to their initial positions, a tank for supplying cutting fluid to said pump, spray jets carried by said first-mentioned cutter head and directed to opposite sides of said second-mentioned cutting tool during return of the cutter heads to their initial positions, and a pipe line connecting said pump to said spray jets.

16. A tube cutoff machine as defined in claim 15 wherein the cutting fluid supply tank is supported below the cutter heads and has an open top for the return thereto of cutting fluid sprayed on said first-mentioned cutting tool.

17. A tube cutoff machine as defined in claim 16 further characterized by the provision of screen in the upper portion of said cutting fluid supply tank so as to catch and separate foreign matter from cutting fluid returned to said tank.

References Cited in the file of this patent

UNITED STATES PATENTS

| | | |
|---|---|---|
| Re. 22,114 | Borzym | June 16, 1942 |
| 2,167,764 | Liebig | Jan. 11, 1916 |
| 2,243,614 | Vogel | May 27, 1941 |
| 2,250,931 | Grieder | July 29, 1941 |
| 2,572,137 | Grieder | Oct. 23, 1951 |
| 2,594,708 | Amiet | Apr. 29, 1952 |
| 2,721,613 | Rice | Oct. 25, 1955 |
| 2,741,309 | Czarnik | Apr. 10, 1956 |